(12) United States Patent
Leenstra et al.

(10) Patent No.: US 12,061,910 B2
(45) Date of Patent: Aug. 13, 2024

(54) DISPATCHING MULTIPLY AND ACCUMULATE OPERATIONS BASED ON ACCUMULATOR REGISTER INDEX NUMBER

(71) Applicant: INTERNATIONAL BUSINESS MACHINES CORPORATION, Armonk, NY (US)

(72) Inventors: Jentje Leenstra, Bondorf (DE); Andreas Wagner, Weil im Schönbuch (DE); Jose E. Moreira, Irvington, NY (US); Brian W. Thompto, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 16/703,934

(22) Filed: Dec. 5, 2019

(65) Prior Publication Data

US 2021/0173662 A1    Jun. 10, 2021

(51) Int. Cl.
*G06F 9/38* (2018.01)
*G06F 9/30* (2018.01)

(52) U.S. Cl.
CPC ........ *G06F 9/3893* (2013.01); *G06F 9/30036* (2013.01); *G06F 9/30101* (2013.01); *G06F 9/3851* (2013.01); *G06F 9/3887* (2013.01)

(58) Field of Classification Search
CPC ............. G06F 9/30036; G06F 9/30101; G06F 9/30098; G06F 9/3893
See application file for complete search history.

(56) References Cited

U.S. PATENT DOCUMENTS 5,838,984 A    11/1998 Nguyen
5,983,256 A    11/1999 Peleg
(Continued)

FOREIGN PATENT DOCUMENTS

CN    104969215 A    10/2015
CN    108874744 A    11/2018
(Continued)

OTHER PUBLICATIONS

Disclosed Anonymously, "Method for removing accumulator dependencies", IP.com Prior Art Database Technical Disclosure, IP.com No. IPCOM000008848D, Jul. 17, 2001, 6 pages.
(Continued)

*Primary Examiner* — Jacob Petranek
(74) *Attorney, Agent, or Firm* — Rakesh Roy

(57) ABSTRACT

A processor unit for multiply and accumulate ("MAC") operations is provided. The present invention may include the processor unit having a plurality of MAC units for performing a set of MAC operations. The present invention may include each MAC unit having an execution unit and a one-write one-read ("1W/1R") register file, where the 1W/1R register file may have at least one accumulator. The present invention may include the execution unit of each MAC unit being configured to perform a subset of MAC operations by computing a product of a set of values received from another register file of the processor unit and adding the computed product to the at least one accumulator. The present invention may include each MAC unit being configured to perform the respective subset of MAC operations in a single clock cycle.

17 Claims, 11 Drawing Sheets

(56) References Cited

U.S. PATENT DOCUMENTS

| | | | |
|---|---|---|---|
| 6,785,800 | B1 | 8/2004 | Yamaura |
| 6,826,679 | B1* | 11/2004 | Laurenti ............. G06F 9/30047 |
| | | | 712/225 |
| 7,334,201 | B1 | 2/2008 | Sanghavi |
| 8,719,828 | B2 | 5/2014 | Lewis et al. |
| 9,275,014 | B2 | 3/2016 | Khan |
| 9,575,890 | B2 | 2/2017 | Busaba et al. |
| 9,727,370 | B2 | 8/2017 | Greiner et al. |
| 10,387,122 | B1 | 8/2019 | Olsen |
| 2005/0240644 | A1 | 10/2005 | Van Berkel |
| 2006/0015703 | A1* | 1/2006 | Ramchandran ....... G06F 9/3895 |
| | | | 712/34 |
| 2006/0041610 | A1* | 2/2006 | Hokenek ............... G06F 7/5443 |
| | | | 708/620 |
| 2006/0095729 | A1 | 5/2006 | Hokenek |
| 2006/0149936 | A1* | 7/2006 | Boukaya ............... G06F 9/3867 |
| | | | 712/225 |
| 2008/0126758 | A1 | 5/2008 | Kwon |
| 2009/0077154 | A1 | 3/2009 | Matsuyama |
| 2009/0248769 | A1 | 10/2009 | Chua |
| 2011/0106871 | A1* | 5/2011 | Symes .................. G06F 9/3887 |
| | | | 708/603 |
| 2013/0205123 | A1 | 8/2013 | Vorbach |
| 2018/0321938 | A1 | 11/2018 | Boswell |
| 2018/0341495 | A1* | 11/2018 | Culurciello .............. G06N 3/04 |
| 2019/0012170 | A1* | 1/2019 | Qadeer ............... G06F 9/30134 |
| 2019/0171448 | A1 | 6/2019 | Chen |
| 2019/0250915 | A1 | 8/2019 | Yadavalli |
| 2020/0160226 | A1* | 5/2020 | Ross ..................... G06K 9/6251 |
| 2020/0218538 | A1* | 7/2020 | Mansell .............. G06F 9/30014 |
| 2020/0320662 | A1 | 10/2020 | Lueh |

FOREIGN PATENT DOCUMENTS

| | | | |
|---|---|---|---|
| JP | 2009181293 | A | 8/2009 |
| WO | 2018154269 | A1 | 8/2018 |
| WO | 2021111272 | A1 | 6/2021 |

OTHER PUBLICATIONS

Disclosed Anonymously, "Methods for Application Checkpointing using Application Dependence Analysis", IP.com Prior Art Database Technical Disclosure, IP.com No. IPCOM000222538D, Oct. 16, 2012, 6 pages.

Disclosed Anonymously, "Using a common Error Correcting Special Purpose Register for correcting errors in a regular file", IP.com Prior Art Database Technical Disclosure, IP.com No. IPCOM000202463D, Dec. 16, 2010, 3 pages.

Kim et al., "An Instruction Set and Microarchitecture for Instruction Level Distributed Processing", ACM Sigarch Computer Architecture News 30(2) • Apr. 2002, 11 pages.

Pedram et al, "On the Efficiency of Register File versus Broadcast Interconnect for Collective Communications in Data-Parallel Hardware Accelerators", IEEE 24th International Symposium on Computer Architecture and High Performance Computing (SBAC-PAD), Oct. 2012, pp. 1-8.

Raihan et al., "Modeling Deep Learning Accelerator Enabled GPUs," Electrical and Computer Engineering, University of British Columbia, arXiv: 1811.08309v2 [cs.MS], IEEE, Feb. 21, 2019, pp. 1-14.

Saghir et al., "A Configurable Multi-Ported Register File Architecture for Soft Processor Cores," Department of Electrical and Computer Engineering, American University of Beirut, ARC 2007, LNCS 4419, 12 pages.

IBM: List of IBM Patents or Patent Applications Treated as Related (Appendix P), Mar. 9, 2020, pp. 1-2.

Thompto et al., "Instruction Handling for Accumulation of Register Results in a Microprocessor," Application and Drawings, Filed on Aug. 29, 2019, 49 Pages, U.S. Appl. No. 16/555,640.

International Search Report and Written Opinion of International Application No. PCT/IB2020/056833 dated Nov. 3, 2020.

Japanese Search Report, Japan Application No. 2022-53315, Dated Jan. 25, 2024, 3 pages.

International Search Report and Written Opinion of International Application No. PCT/IB2020/061262 dated Nov. 30, 2020., 9 Pages.

\* cited by examiner

DISPATCHING MULTIPLY AND ACCUMULATE OPERATIONS BASED ON ACCUMULATOR REGISTER INDEX NUMBER

BACKGROUND

The present invention relates to the field of digital computer systems, and more specifically, to a processor unit for performing a set of one or more multiply and accumulate ("MAC") operations.

Computation of MAC operations is commonly used in a number of algorithms such as training of deep neural networks, image processing, and other machine learning techniques. For example, in case of a deep neural network, MAC operations may involve activations and gradients. However, conventional electronic systems for the computation of MAC operations may be resource intensive. In particular, there is a need of energy efficient and resource saving architectures for performing such operations.

SUMMARY

Various embodiments provide a processor unit for performing a set of one or more MAC operations, method, computer program product and MAC unit as described by the subject matter of the independent claims. Advantageous embodiments are described in the dependent claims. Embodiments of the present invention can be freely combined with each other if they are not mutually exclusive.

In one aspect, embodiments of the present invention discloses a processor unit for multiply and accumulate ("MAC") operations. In one embodiment, the processor unit may include a plurality of MAC units for performing a respective subset of MAC operations of a set of MAC operations. In one embodiment, each MAC unit of the plurality of MAC units may include a respective execution unit and a respective one-write one-read ("1W/1R") register file. In one embodiment, the respective 1W/1R register file may have at least one accumulator. In one embodiment, the processor unit may include another register file. In one embodiment, the respective execution unit of each MAC unit may be configured to perform the respective subset of MAC operations of the set of MAC operations by computing a product of a set of values received from the another register file and adding the computed product to a content of the at least one accumulator of the MAC unit. In one embodiment, each MAC unit may be configured to perform the respective subset of MAC operations in a single clock cycle.

In advantageous embodiments, each MAC unit of the plurality of MAC units may include an associated index. Accordingly, each MAC unit may be configured to perform the respective subset of MAC operations by executing a processor instruction referencing the associated index.

In advantageous embodiments, the associated index may include an architected accumulator register index of the at least one accumulator of each MAC unit.

In advantageous embodiments, the at least one accumulator may include a respective accumulator element, where the computed product may be added to a content of the respective accumulator element. In advantageous embodiments, each MAC unit may be configured to perform the respective subset of MAC operations of a set of MAC operations using the respective accumulator element of the at least one accumulator.

In advantageous embodiments, the processor unit may include a dispatch/issue unit. In advantageous embodiments, the dispatch/issue unit may be configured to process a plurality of processor instructions, select a MAC unit using the associated index, and send a respective set of processor instructions to the selected MAC unit for performing the set of MAC operations. In advantageous embodiment, the dispatch/issue unit may include the MAC unit therein.

In advantageous embodiments, the respective set of processor instructions may include at least one operand. The at least one operand may indicate the at least one accumulator as a source and target register of the respective set of processor instructions. The at least one operand may also indicate at least one further register, of another register file, as including a set of numbers.

In advantageous embodiments, the dispatch/issue unit may be configured to dispatch the plurality of processor instructions in accordance with a single threaded ("ST") mode such that the selected MAC unit may receive the respective set of processor instructions from a single thread.

In advantageous embodiments, the dispatch/issue unit may be configured to dispatch the plurality of processor instructions in accordance with a two-way simultaneous multithreading ("SMT2") mode such that the selected MAC unit may receive the respective set of processor instructions from any one of two threads.

In advantageous embodiments, the dispatch/issue unit may be configured to dispatch the plurality of processor instructions in accordance with a four-way simultaneous multithreading ("SMT4") mode such that each MAC unit of the plurality of MAC units may receive the respective set of processor instructions from respective two threads.

In advantageous embodiments, each MAC unit may include at least one multiplier for computing the product and at least one adder for performing the addition of the computed product.

In advantageous embodiments, the processor unit may be configured to perform further sets of MAC operations, where all the sets of MAC operations provide all elements of an output matrix. In advantageous embodiments, the output matrix may include a result of a matrix convolution on an input matrix.

In one aspect, embodiments of the present invention disclose a method and a computer program product for performing MAC. Operations. The present invention may include, receiving, at a multiplier of a MAC unit, a set of values from a register file. The present invention may include calculating, using the multiplier, a product of the received set of values. The present invention may include, reading a current content of an accumulator of the MAC unit. The present invention may include, calculating, using an adder of the MAC unit, a sum of the read current content of the accumulator and the calculated product of the received set of value. The present invention may include, writing the calculated sum to the accumulator of the MAC unit.

In one aspect, embodiments of the present invention discloses a MAC unit. In one embodiment, the MAC unit may include an execution unit and a one-write one-read ("1W/1R") ported register file. In one embodiment, the 1W/1R ported register file may include at least one accumulator. In one embodiment, the execution unit of the MAC unit may be configured to perform a MAC operation by computing a product and adding the product to a content of the at least one accumulator of the MAC unit.

In advantageous embodiments, the execution unit of the MAC unit may be configured to consecutively perform a plurality of MAC operations using a same accumulator for accumulating the product of each MAC operation of the plurality of MAC operations.

In advantageous embodiments, the MAC unit may include a plurality of accumulators. In advantageous embodiment, the MAC unit may be configured to perform a plurality of MAC operations in parallel using a respective accumulator of the plurality of accumulators.

In advantageous embodiments, the at least one accumulator of the MAC unit may include a plurality of accumulator elements. In advantageous embodiments, the MAC unit may include a plurality of multipliers and an adder. In advantageous embodiments, the MAC unit may be configured to perform a plurality of MAC operations in parallel using respective accumulator elements of the plurality of accumulator elements and respective multipliers of the plurality of multipliers.

The present disclosure may provide an energy-efficient and application-specific processor for performing MAC operations. The processor unit has a small number of register file ports which may outperform architectures with a larger number of ports. In particular, the use of a register file having a single read port and single write port may enable a simplified hardware control and reduce the energy consumption. The implementation of the 1write-port/1read-port register file ("1W/1R") may require less wiring, a smaller occupied area, and less power demand compared, for example, to a 2W/2R register file that provides two read and two write ports to connect two MAC execution units. The connectivity reduction may maintain the same application speed, reduce the energy consumption, and allow for an increase in processor frequency. In addition, the present subject matter may prevent a sharing of one register file between the MAC units. It is contemplated that providing each MAC unit with its own register file may speed up the MAC operations as each execution unit may independently and optimally be connected to its respective register file.

The present subject matter may enable to perform MAC operations as basic arithmetic operations using single instruction multiple data ("SIMD") operands. This may improve the efficiency of a processor in that the SIMD operands can be efficiently stored in separate register files so that they can be loaded from the register files into the MAC unit in a single clock cycle.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
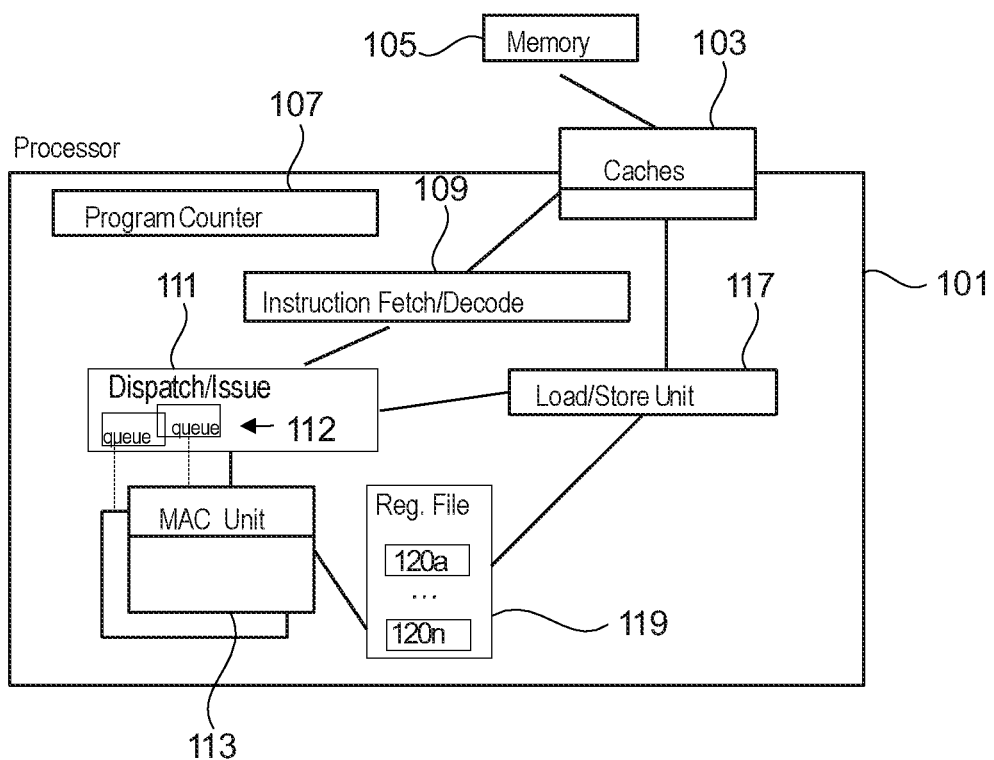
FIG. 1 is a block diagram illustrating an exemplary structure of a processor system according to at least one embodiment.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

According to one embodiment, each MAC unit of the MAC units is associated with an index, wherein the MAC unit is configured to perform the MAC operation by executing a processor instruction referencing the index. This may enable identifying a specific MAC unit to process the instruction in an optimal way by reading the index of the instruction. This may be optimal as such reading is anyhow performed in processor systems in order to identify the operands of the instruction (e.g., there may be no need for extra operations to read the index).

Each MAC unit of the MAC units may be configured to perform a respective subset of one or more MAC operations of the set of MAC operations. The subset of MAC operations, to be performed by the MAC unit, may for example compute one or more elements of a matrix C. For example, the matrix C may be defined by the following formula [1]:

$$C_{ij} = \Sigma_k A_{ki} B_{jk} \quad [1]$$

In the above formula [1], the subset of MAC operations may comprise the sum of products $\Sigma_k A_{ki} B_{jk}$, for a given value of k. For example, if A, B and C are 4×4 matrices, a subset of MAC operations may comprise 4 MAC operations A11*B11, A21*B12, A31*B13 and A41*B14 for obtaining element C11. Each group of one or more MAC operations that can be performed, by the MAC unit, in one clock cycle, may be performed by executing a processor instruction. The processor instructions may for example be executed in parallel by the MAC units. For example, the set of MAC operations comprises N MAC operations to be performed by one MAC unit and other N MAC operations to be performed by the other MAC unit. The two MAC units may be configured to consecutively perform each pair of MAC operations in parallel (e.g., if N=3, 3 pairs of MAC operations may consecutively be performed in parallel). This may particularly be advantageous if each MAC unit comprises a single accumulator that is used to store one element. The accumulator may be a register. In another example, the accumulator may comprise multiple fields or accumulator elements (e.g., m elements), wherein each accumulator element may be used to accumulate results of respective MAC operations. In this case, the MAC unit may be configured to perform m MAC operations in parallel in one clock cycle.

If more than one accumulator exists in each MAC unit, a pipelined execution of the instructions may be advantageously used. According to one embodiment, each MAC unit of the MAC units is configured to perform the respective MAC operation in at least one clock cycle (e.g., in multiple clock cycles). The MAC operation execution may for example comprise four clock cycles to generate the result of the processor instruction. The processor instruction may comprise four steps, wherein each step contributes to obtain the overall result of the processor instruction being processed. In every clock cycle, a new processor instruction may be started using a different accumulator register. As soon as the result of the instruction is available, after 4 cycles, the accumulator used by the first instruction can be used again by a subsequent instruction. According to one embodiment, the processor instructions are decoded in one clock cycle.

According to one embodiment, the index is an architected accumulator register index of the accumulator of the MAC unit. This may save processing resources because the same index is used to index both the accumulator and the MAC unit that comprises the accumulator. This is by contrast to another implementation that would require separate indexing of the MAC unit and the accumulators.

According to one embodiment, the processor unit further comprises a dispatch and/or issue unit. The dispatch and/or issue unit is configured to process multiple processor instructions, select MAC units using the index and send the processor instructions to the selected MAC units for performing the set of MAC operations. This may enable a seamless integration of the present subject matter in existing systems, by making minimal changes to the existing dispatch and/or issue units.

According to one embodiment, each processor instruction comprises operands indicating the accumulator as a source and target register of the instruction and indicating further registers, of the other register file, comprising source data to be multiplied and accumulated. The source data comprises the numbers. Using the accumulator as a source and target register enables a resource saving access to data. This is by contrast to a MAC unit using two separate accumulators, one for writing and one for reading data, which may introduce extra latencies and additional source-target dependency tracking logic. Due to the reduced connectivity in a processor unit using a single accumulator (e.g., by adequately placing a single accumulator near the execution unit), the single accumulator can be accessed multiple times faster than accessing separate accumulators.

According to one embodiment, the MAC units are part of the dispatch and/or issue unit. This may save area on a chip and power compared to a separate implementation of the MAC units. For example, in case the MAC units are implemented as separate components of the dispatch and/or issue unit, they may occupy more space and may use extra power sources.

According to one embodiment, the dispatch and/or issue unit is configured to dispatch the multiple processor instructions in accordance with a single threaded ("ST") mode so that the MAC units receive processor instructions of a single thread.

For example, the processor unit may operate in a ST mode, so that only MAC operations of one thread may be performed or handled at a time.

According to one embodiment, the dispatch and/or issue unit being configured to dispatch the multiple processor instructions in accordance with a two-way simultaneous multithreading ("SMT2") mode so that the MAC units receive processor instructions of any one of two threads.

According to one embodiment, the dispatch and/or issue unit is configured to dispatch the multiple processor instructions in accordance with a four-way simultaneous multithreading ("SMT4") mode so that each MAC unit of the MAC units receives processor instructions from respective two threads.

These embodiments may enable a seamless integration of the present subject matter with existing thread enabling systems.

According to one embodiment, the processor unit is configured to perform further sets of MAC operations, wherein all the sets of MAC operations provide all elements of an output matrix. The output matrix is a result of a matrix convolution on an input matrix. For example, the input matrix may represent pixels of an image. A kernel may be used to perform a convolution with the pixel data stored in the input matrix. The kernel does, for example, edge detection, and operates on a sub-matrix of the input matrix of the same size as the kernel. The output matrix is the result of the convolution of the sub-matrix matching the kernel size at an input matrix position.

Referring to FIG. 1, a block diagram illustrating a structure of a processor system 101 in accordance with one embodiment is depicted.

The processor system 101 may enable storing data for performing operations on the stored data. According to one embodiment, one or more levels of a cache 103 of the processor system 101 may be employed to buffer memory data in order to improve processor performance. The cache 103 may include a high speed buffer holding cache lines of memory data that are likely to be used. For example, typical cache lines may include 64, 128, or 256 bytes of memory data. According to one embodiment, the cache 103 may be configured to cache data of higher hierarchical storage such as a main memory storage 105.

According to one embodiment, the processor system 101 may further include a register file 119 comprising registers 120*a-n*. The registers 120*a-n* may, for example, include general-purpose registers that each includes a certain number of bits to store data items processed by instructions executed in the processor system 101.

According to one embodiment, the instructions may be provided by a compiler. For example, a source code of a program may be compiled into a series of machine-executable instructions defined in an instruction set architecture ("ISA") associated with the processor system 101. The ISA may include at least one processor instruction defined in accordance with at least one embodiment of the present disclosure. The instructions of the ISA may be provided to process data stored in memory 105 and/or in the registers 120*a-n* of the register file 119 of the processor system 101. According to one embodiment, when the processor system 101 starts to execute the executable instructions, these machine-executable instructions may be placed in order to be executed sequentially.

According to one embodiment, instruction fetch/decode unit 109 may be employed to fetch placed instructions. For example, the instruction fetch/decode unit 109 may fetch the next sequential instructions, the target instructions of branch taken instructions, or the first instructions of a program following a context switch. The fetched instructions may be decoded by the instruction fetch/decode unit 109.

According to one embodiment, the decoded instruction(s) may be passed to a dispatch/issue unit 111. The dispatch/issue unit 111 may deposit the instructions in one or more issue queues 112, where the instructions may wait for their source operands and an appropriate MAC unit 113 of the processor system 101 to become available. For example, each MAC unit 113 of the MAC units 113 may be associated with an issue queue 112 such that instructions to be executed by the MAC unit 113 may be queued in the issue queue 112 associated with the MAC unit 113. The dispatch/issue unit 111 may deposit the instructions in an issue queue 112 based on an index that is assigned to the MAC unit 113 of the issue queue. This index may be part of the instructions. That is, by reading the index from an instruction, the dispatch/issue unit 111 may know (e.g., determine) which MAC unit 113 can execute the instruction. Each MAC unit 113 of the MAC units 113 may be configured to execute one respective type of instruction which may not be executed by other MAC units 113. In one embodiment, a type of an instruction may be defined by the registers associated with the instruction.

In conventional methods, every execution unit may be implemented to execute every instruction (e.g., any instruction can go to any execution unit). However, in contrast to the operation of the present disclosure, the conventional methods may be more expensive in term of processing resources.

According to one embodiment, each issue queue 112 may include a window logic which may be responsible for monitoring dependencies between instructions in the queue and issuing instructions to the respective MAC unit 113. The window logic may include a wakeup logic and a select logic. The wakeup logic may be responsible for invoking instructions waiting in the issue queue 112 for the source operands to become available. Once all the source operands of an instruction are available, the instruction may be flagged ready for execution. The select logic may be responsible for selecting instructions for execution from the pool of ready instructions. An instruction may be ready if all of its source operands are available. Then the operand values of the instruction may be loaded from the memory 105 and/or registers using a load/store unit 117.

A MAC unit 113 may typically receive information about instructions from the dispatch/issue unit 111 and may perform operations on operands according to the operation code of the instruction. Operands are provided to the MAC unit 113 from registers in accordance with the present disclosure. Results of the execution, when stored, may be stored either in memory 105 and/or registers 119. According to one embodiment, each MAC unit 113 of the MAC units 113 may include at least one multiplier and at least one adder. If the MAC unit 113 includes more than one multiplier, each multiplier may be associated with a respective accumulator element of the accumulator of the MAC unit 113. Each multiplier of the MAC unit 113 may be configured to perform the product of two numbers and the adder may be configured to add the product to the content of an accumulator associated with the multiplier or to a content of an accumulator element associated with the multiplier. The MAC unit 113 may be configured to perform a MAC operation in at least one clock cycle. In one example, the MAC unit 113 may include an X number of multipliers that may enable the MAC unit 113 to perform an X number of MAC operations in at least one clock cycle.

According to one embodiment, a program counter (instruction counter) 107 may keep track of the address of the current instruction to be executed. For example, a program counter 107 in processor, such as, a z/Architecture® (z/Architecture and all IBM-based trademarks and logos are trademarks or registered trademarks of International Business Machines Corporation and/or its affiliates) processor may include 64 bits and may be truncated to 31 or 24 bits to support prior addressing limits. A program counter 107 may typically be embodied in a program status word ("PSW") of a computer such that it persists during context switching. In one embodiment, the program counter may be incremented by an amount equal to the number of bytes of the current instruction.

The processor system 101 may be configured to perform a pipelined execution of the instructions. For example, a four-cycle latency pipelined execution may be used by each MAC unit 113 of the processor system 101 such that each instruction may take the MAC unit 113 four clock cycles to produce the result of the MAC operation. For that, the execution of the instruction at the MAC unit 113 may be broken down into four processes, where one of the four processes may include the multiplication process and another of the four processes may include the accumulation process by the MAC unit.

According to one embodiment, the processor system 101 may be configured to operate in an ST mode, an SMT2 mode, or an SMT4 mode. In ST mode, MAC operations from one thread may be performed or handled at a time by the MAC units 113. For example, in the ST mode, each of the MAC units 113 may be configured so that the MAC units 113 receive instructions from one specific thread (e.g., T0). In SMT2 mode, the MAC units 113 may receive instructions from any one of two threads. For example, in the SMT2 mode, each of the MAC units 113 may be configured so that the MAC units 113 receive instructions from thread T0 and/or thread T1. In SMT4 mode, each MAC unit 113 of the MAC units 113 may receive processor instructions from all four threads (e.g., T0, T1, T2 and T3) or the MAC unit 113 may operate in a split mode to receive two threads. For example, in split mode, if the processor system 101 includes two MAC units 113, one MAC unit 113 may be configured to process instructions from thread T0 and/or thread T2 and the other MAC 113 unit may be configured to process instructions from thread T1 and/or thread T3. As described previously, according to one embodiment, the dispatch/issue unit 111 may be configured to dispatch the multiple processor instructions in accordance with the SMT2 mode and the SMT4 mode. As also described previously, according to one embodiment, the dispatch/issue unit 111 may deposit the instructions in one or more issue queues 112, where the instructions may wait for their source operands and an appropriate MAC unit 113 of the processor system 101 to become available. Therefore, it is contemplated that in at least one embodiment, the one or more issue queues 112 may be implemented as multithreaded issue queues for dispatching processor instructions to the MAC unit 113 in accordance with the SMT2 and SMT4 modes.

Thus, the processor system 101 may enable processing instructions from one or more programs using MAC units 113. For example, the source code of a program may implement one or more MAC operations. A MAC operation may include multiplying two numbers and adding the result of the multiplication to an accumulated value. At least one MAC operation may be performed by the MAC unit 113 by executing a respective processor instruction of the ISA.

Figure 2A:
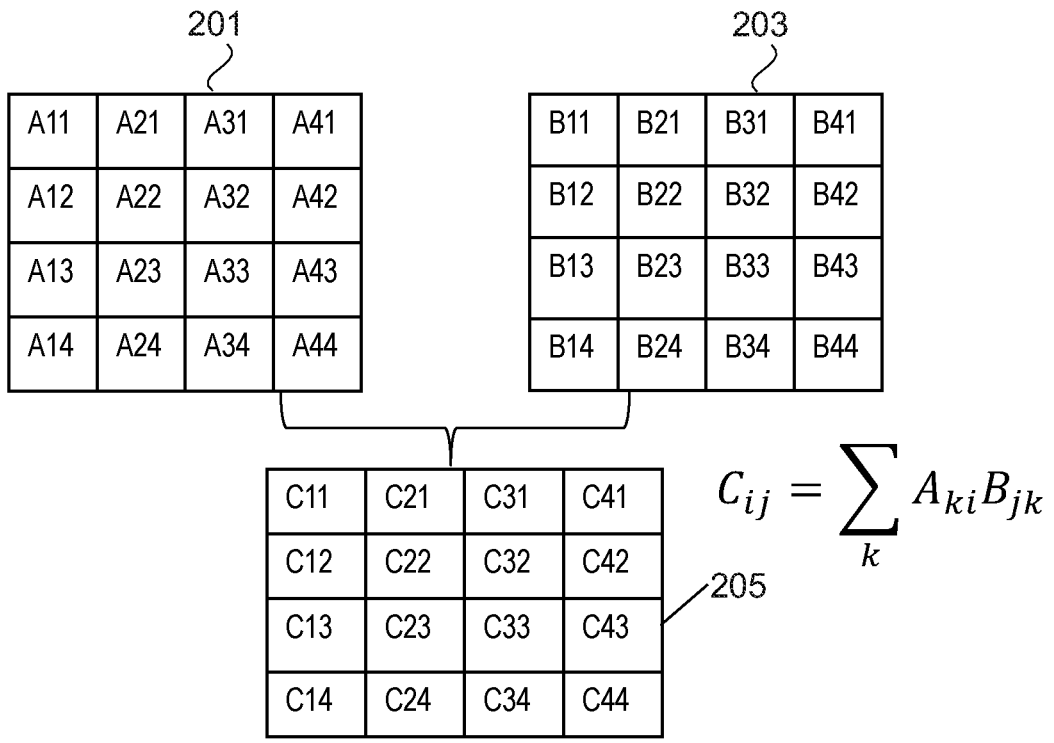
FIG. 2A is a block diagram illustrating an exemplary matrix operation of a MAC operation according to at least one embodiment.

Referring now to FIG. 2A, a block diagram illustrating an exemplary matrix operation of a MAC operation according to at least one embodiment is depicted.

According to one embodiment, the matrix operation of FIG. 2A may be referred to as a matrix multiply and accumulate ("MMA") operation. The matrix operation may multiply an input matrix 201 by an input matrix 203, and the accumulated result may include a resulting matrix 205. If matrix 201 includes an M-by-K matrix and matrix 203 includes a K-by-N matrix, then the resulting matrix 205 may include an M-by-N matrix. Thus, each element of the resulting matrix 205 may be obtained by K MAC operations. As shown in FIG. 2A, the input matrix 201 may include a 4×4 matrix and the input matrix 203 may include a 4×4 matrix. According to one embodiment, the matrix operations may not be limited to the dimensions illustrated in FIG. 2A, which are provided as examples.

One or more accumulators may be used for computing the MAC operations and storing elements of the resulting matrix 205. An accumulator may have an accumulator size, e.g., 512 bits, indicating the size of the accumulator. An accumulator may include multiple accumulator elements or fields. An accumulator element may have an accumulator element size which may be smaller than the accumulator size, e.g., an accumulator element size may be 32 bits. Each accumulator element of the accumulator may have or occupy respective number of bits of the accumulator, e.g., a first accumulator element may occupy bits 0 to 31 of the accumulator, the second accumulator element may occupy bits 32 to 63 and the sixteenth accumulator element may occupy the bits 480 to 511. In one embodiment, the accumulator element size may be defined as the size of an element of the resulting matrix 205. This may be advantageous as the accumulator may be configured to include as many accumulator elements as the number of elements in the resulting matrix 205. This may enable storing all elements of the resulting matrix 205 in one accumulator.

Figure 2B:
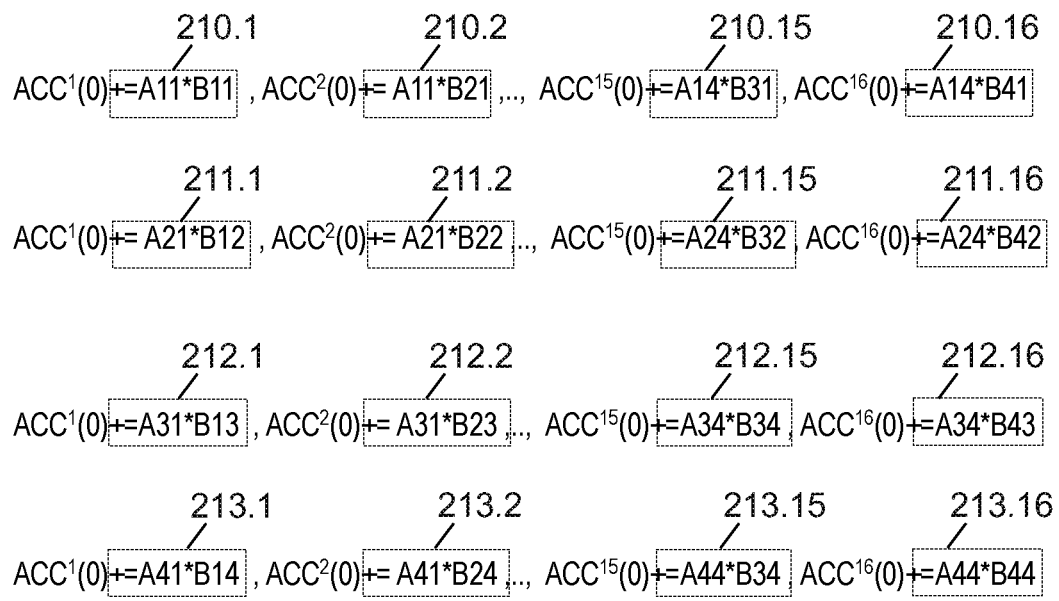
FIG. 2B is a block diagram illustrating an accumulator for the computation of the elements of the matrix operation according to at least one embodiment.
Figure 2C:
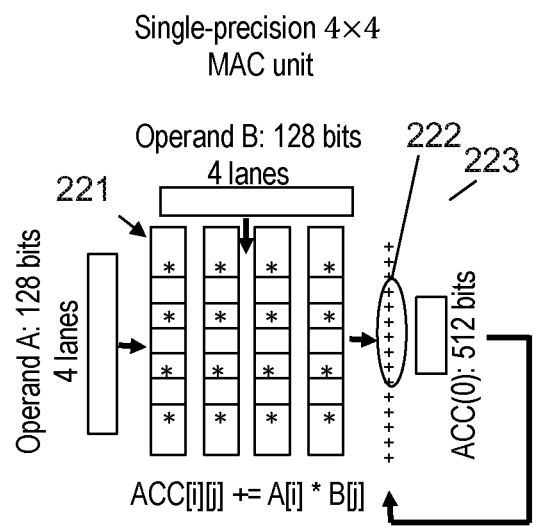
FIG. 2C is a block diagram illustrating an exemplary MAC unit according to at least one embodiment.

Referring now to FIG. 2B, a block diagram illustrating an accumulator for the computation of the elements of the matrix operation according to at least one embodiment is depicted. Referring additional to FIG. 2C, a block diagram illustrating an exemplary MAC unit according to at least one embodiment is depicted.

According to one embodiment, FIGS. 2B-2C indicate that the elements of the resulting matrix 205 may be computed using one MAC unit having one accumulator 223, one adder 222, and 16 multipliers 221. As shown in FIG. 2B, each element of the resulting matrix 205 may be stored in a respective accumulator element of a single accumulator ACC(0). An accumulator element of the accumulator ACC (0) may be referred to as $ACC^j(0)$ in FIG. 2B, where j=1, . . . , 16. Element C11 of the resulting matrix 205 may be stored in an accumulator element $ACC^1(0)$ having bits 0 to 31 of the accumulator ACC(0), C21 may be stored in an accumulator element $ACC^2(0)$ having bits 32 to 63 of the accumulator ACC(0), C31 may be stored in an accumulator element $ACC^3(0)$ having bits 64 to 95 of the accumulator ACC(0), C41 may be stored in an accumulator element $ACC^4(0)$ having bits 96 to 127 of the accumulator ACC(0) and so on. Accordingly, the storage of 16 times a 32 bit element may result in using the full width of the 512 bit of the accumulator 223.

Before computing the elements of the resulting matrix 205, each accumulator element $ACC^j(0)$ of the accumulator ACC(0) may be initialized with (or store) an initial value. The initial value may, for example, be zero. In another example, the element $ACC^j(0)$ may be initialized by other values such as a pre-computed portion of a matrix element (e.g., for obtaining C11, the accumulator element $ACC^1(0)$ may be initialized with the value of A11*B11). In another example, the initialization may be performed by a first instruction that may differ from the MAC operation instruction, such that the multiplication result may be stored in the accumulator element of the accumulator ACC(0) without using the accumulator ACC(0) as an input. The example in FIG. 2B uses the K dimension of matrix 201 as an outmost loop of programing loops used for computing an outer product. The MMA operation may load a column of matrix 201 and a row of matrix 203 once as operands from the other register file, in order to compute its outer product, and accumulate the result of this outer product as an element in the result matrix 205. Afterward, this column of matrix 201 and row of matrix 203 may not be used again.

For example, for obtaining each element of the 16 elements C11 to C44 of the result matrix 205, four MAC operations may be performed using a respective accumulator element. As indicated in FIG. 2B, in order to obtain the element C11, the MAC operations 210.1, 211.1, 212.1, and 213.1 may be performed using the content of the accumulator element $ACC^1(0)$.

Knowing the structure of the resulting matrix and the nature of the MMA operation, the MAC units may be configured to perform the MMA operation in an optimal way. For example, the MMA operation may be split into sets of MAC operations so that each set of MAC operations may be performed in one clock cycle by a MAC unit. Following the example of FIG. 2A and as shown in FIG. 2B, the matrix operation may involve four sets of MAC operations 210.1-16, 211.1-16, 212-.1-16, and 213.1-16 that each can be processed in one clock cycle by the MAC unit of FIG. 2C. Each MAC operation involves the multiplication and the addition of the result of the multiplication to the content of a respective accumulator element. The execution of each set of the four sets of MAC operations may be performed by issuing a respective instruction, such as, for example, an integer-based GER instruction. The accumulator element used by each MAC operation of a set of MAC operations may be indicated in the GER instruction. For example, accumulator element used by each MAC operation of a set of MAC operations may be determined by the GER instruction type (e.g., the GER instruction may have different types, wherein each type may be used for different numbers of MAC operations). The GER instruction name determines the number of accumulator elements and data types in the operands as well as the 512 bit accumulator.

In the first MAC operation of the set of 16 MAC operations, the product A11*B11 may be performed and the result of the product may be added to the content of the first accumulator element $ACC^1(0)$ having bits 0 to 31 of the accumulator ACC(0) which may be zero. Thus, after the first MAC operation, the first accumulator element $ACC^1(0)$ may contain the product A11*B11. In the second MAC operation of the set of 16 MAC operations, the product A11*B21 may be performed and the result of the product may be added to the content of the second accumulator element $ACC^2(0)$ of the accumulator ACC(0) which may be zero. Thus, after performing the set of 16 MAC operations 210.1-210.16, each element $ACC^j(0)$ of the accumulator ACC(0) may include an intermediate value of a respective element of the resulting matrix as indicated in FIG. 2B. After completing the set of 16 MAC operations 210.1-210.16, another set of 16 MAC operations 211.1-211.16 may be performed by the MAC unit. This repetition may be performed until all sets of MAC operations are performed. FIG. 2B shows the evolution of the content of each accumulator element $ACC^j(0)$ of the accumulator ACC(0) that results from a non-pipelined execution of the sets of MAC operations.

However, for performing multiple matrix operations (e.g., similar to the matrix operation of FIG. 2A), a pipelined execution of the MAC operations may be advantageous. For example, in case of four matrix operations, where each matrix operation includes four sets of MAC operations as described with the matrix operation of FIG. 2A, the execution of the 16 sets of MAC operations may be performed as follows.

In the case of a four cycle pipelined execution, each MAC operation may be performed in four steps. Thus, each set of the 16 sets of MAC operations may be performed in four clock cycles. For example, the first step of each MAC operation of the set of MAC operations may be performed by a MAC unit in one, same, clock cycle (e.g., all first steps of the set of MAC operations may be performed in one, same, clock cycle). The second step of each MAC operation of the set of MAC operations may be performed by the MAC unit in another, same, clock cycle. The third step of each MAC operation of the set of MAC operations may be performed by the MAC unit in another, same, clock cycle. The fourth step of each MAC operation of the set of MAC operations may be performed by the MAC unit in another, same, clock cycle. The pipelined execution enables performing different steps of different sets of MAC operations during a same clock cycle.

The elements of each resulting matrix of the four resulting matrices of the four matrix operations may be stored in respective accumulators ACC(0), ACC(1), ACC(2), and ACC(3).

The example provided in FIGS. 2A-C illustrates the MAC computation for 4×32 bit elements as input sources: SRC1 and SRC2. However, it is contemplated that other element widths, such as, for example, 8×16 bit or 16×8 bit, may be handled in a similar way by multiplying and adding two pairs of 16 bit in the 32 bit wide accumulator elements or doing the MAC operation on four pairs of 8 bit to calculate the 32 bit wide accumulator fields during the four cycles execution. In a similar manner, the accumulator element size may be less or more as 32 bit as well as the number of elements stored into the ACC registers. FIG. 2C illustrates the details of the 4×4 implementation with a 4×32 bit operand A (e.g., representing one column) and a 4×32 bit operand B (e.g., representing one row) as inputs and the 512 bit accumulator illustrated at the output storing the 16 32 bit results. FIG. 2B illustrates the operation by an outer product computation algorithm. However, the matrix operation may not be limited to these outer product computation algorithms. Other algorithms including the inner product or dot product algorithms may be used.

Figure 3:
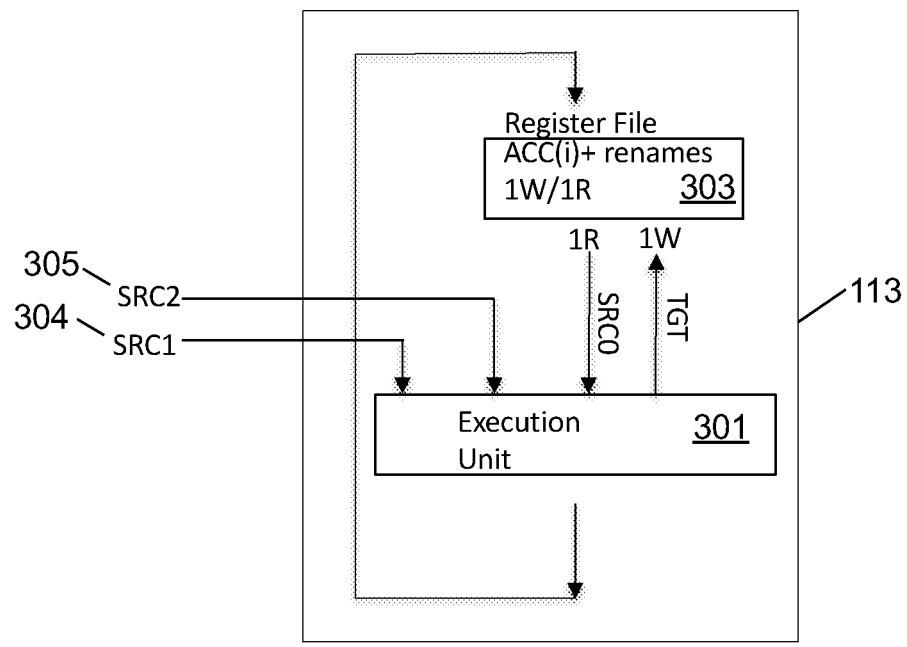
FIG. 3 is a block diagram illustrating an exemplary MAC unit depicted in FIG. 1 according to at least one embodiment.

Referring now to FIG. 3, a block diagram illustrating a MAC unit according to at least one embodiment is depicted. According to one embodiment, the MAC unit of FIG. 3 may depict the MAC unit 113.

According to one embodiment, the MAC unit 113 may include an execution unit 301 and a register file 303. The execution unit 301 may read accumulator data (ACC(i) data) from the register file 303 and may write accumulator data into the register file 303. The register file 303 may include one or more accumulators. In one embodiment, each accumulator of the register file 303 may include an architected accumulator register index i so that each accumulator may be referred to as ACC(i). The index may be an integer number which may include an even or odd number. The architected accumulator ACC(i) may be renamed, such that the register file entry storing the accumulator ACC(i) differs from the register file entry number. The register file entry number containing the state of the accumulator ACC(i) may be tracked by the logic of the dispatch/issue unit 111.

The register file 303 may include a 1W/1R ported register file. The register file 303 may be advantageous as it may require less wiring, less area, and less power demand compared for example to 2W/2R register files.

The MAC unit 113 may be configured to receive a processor instruction from a respective issue queue of the dispatch/issue unit 111 in order to perform a MAC operation. The processor instruction may, for example, be named "GER" and may be defined as follows: GER ACC(i)←ACC(i), vector scalar register ("VSR")(j), VSR(k). The processor instruction GER may include operands indicating the accumulator ACC(i) as a source and target register of the processor instruction and indicating further source registers VSR(j), VSR(k) of the register file 119. The source registers VSR(j), VSR(k) may include the numbers to be multiplied. As shown in FIG. 3, the execution unit 301 may read the values/numbers to be multiplied 304 and 305 from the register file 119 and read the content (referred to as SRC0) of the accumulator ACC(i) from the register file 303 in order to perform a MAC operation. The result (referred to as TGT) of the MAC operation may be stored in the accumulator ACC(i). Thus, each accumulator ACC(i) of the register file 303 may enable the MAC unit 113 to perform a respective set of one or more MAC operations so that resulting values of the set of MAC operations may be accumulated in the accumulator ACC(i).

Following the example of FIG. 2A, the MAC unit 113 may be configured to perform the four sets of 16 MAC operations for obtaining elements C11 . . . C44 of the resulting matrix 205 using the accumulator ACC(0). For that, the execution unit 301 may include multiple multipliers and the accumulator ACC(0) may include multiple elements as described with reference to FIG. 2C.

In order to compute the overall resulting matrix 205, a stream of four processor instructions each performing a set of 16 MAC operations for obtaining C11 . . . C44 may be received at the MAC unit. Each processor instruction of the stream references accumulator ACC(0) of the MAC unit, and which accumulator element of the accumulator ACC(0) to receive which result of a multiplication. For each processor instruction of the stream, the MAC unit may perform 16 MAC operations and accumulate the results to the respective content of the accumulator element referenced in the processor instruction. For example, a processor instruction may compute among other products, the product A11*B11 and add the product to the respective accumulator element $ACC^1(0)$ followed by another instruction to compute at least A21*B12 and add the product to a respective accumulator etc.

The execution step of each MAC operation may be performed by the MAC unit 113 in one clock cycle or in multiple clock cycles by a pipelined implementation.

Figure 4:
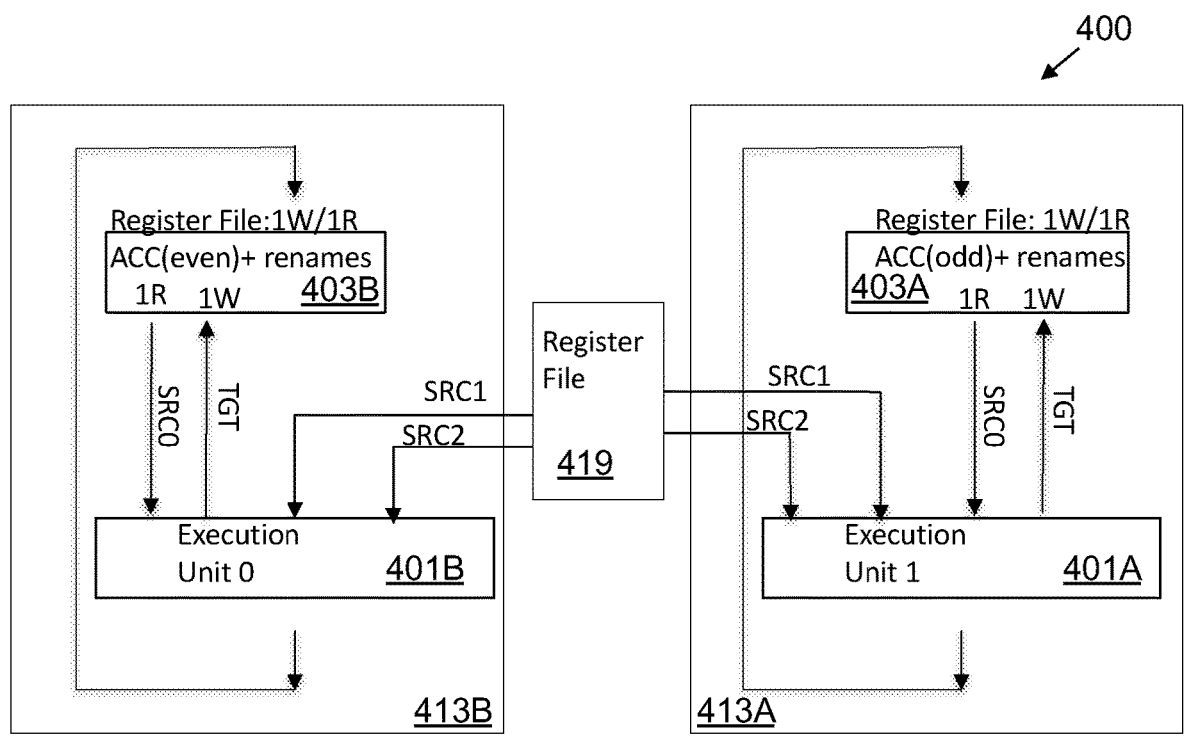
FIG. 4 is a block diagram illustrating an exemplary processor unit according to at least one embodiment.

Referring now to FIG. 4, a block diagram illustrating a processor unit 400 according to at least one embodiment is depicted.

The processor unit 400 may include two MAC units 413A and 413B. The MAC unit 413A may include an execution unit 401A and a register file 403A. The execution unit 401A may read data from the register file 403A and may write data into the register file 403A. The register file 403A may include one or more accumulators. Each accumulator of the register file 403A may include an architected accumulator register index odd so that each accumulator may be referred to as ACC(odd). The index odd may be an odd number. The MAC unit 413B may include an execution unit 401B and a register file 403B. The execution unit 401B may read data from the register file 403B and may write data into the register file 403B. The register file 403B may comprise one or more accumulators. Each accumulator of the register file 403B may include an architected accumulator register index even so that each accumulator may be referred to as ACC (even). The index even may be an even number. Each register file of the register files 403A and 403B may be a 1W/1R ported register file. Each of the MAC units 413A-B may be configured to operate as describe with reference to the MAC unit 113 of FIG. 3.

In one embodiment, the processor unit 400 may further include a register file 419 which may provide the numbers to be multiplied by each of the MAC units 413A and 413B.

According to one embodiment, each of the MAC units may be associated with a respective index. For example, the MAC unit 413A may be associated with an odd index and MAC unit 413B may be associated with an even index. Each MAC unit may receive its own instructions from the respective issue queue (e.g., the dispatch and/or issue unit that issues instructions to the processor unit 400 may comprise two issue queues, one issue queue for odd indexed instructions and another issue queue for even indexed instructions). In another embodiment, the dispatch and/or issue unit may comprise a single issue queue with at least two issue ports. In this embodiment, one issue port may be configured to issue even indexed instructions to the even MAC unit 413B and the other issue port may be configured to issue the odd indexed instructions to the odd MAC unit 413A. However, the present disclosure is not limited to such implementations.

For example, the MAC unit 413A may comprise four accumulators ACC(1), ACC(3), ACC(5), and ACC(7) and the MAC unit 413B may comprise four accumulators ACC (0), ACC(2), ACC(4), and ACC(6). Each of the MAC units 413A-B may receive a respective processor instruction as described with reference to FIG. 3. The processor instruction may reference an index that corresponds to the MAC unit which receives instruction. Accordingly, the processor unit 400 may enable performing two processor instructions in parallel by the MAC units 413A-B.

The processor unit 400 may be configured to perform a pipelined execution of the instructions. Assuming for example, that eight processor instructions are received at the processor unit 400 (e.g., as a stream of instructions, GER(0), GER(2), GER(3), GER(1), GER(5), GER(6), GER(7), and GER(4) whereby GER(i) with reference to FIG. 4 uses accumulator ACC(i) as a source SRC0 and a target TGT and the latency to execute a GER(i) instruction is four cycles). Each instruction GER has an even or odd index. In this case, the instructions GER(0), GER(2), GER(4) and GER(6) may be in the issue queue associated with MAC unit 413B and instructions GER(1), GER(3), GER(5) and GER(7) may be in the issue queue associated with MAC unit 413A. If there is one single accumulator that can comprise only one element, GER(i) may enable performing one step of the four steps of one MAC operation. If there are m accumulator elements of one accumulator that can comprise m elements, GER(i) may enable performing one same step of each MAC operation of m MAC operations. Following the latency of four pipelined execution example, the stream of instructions may be performed cycle by cycle as follows:

Cycle c: GER(0), GER(3)
c+1: GER(2), GER(1)
c+2: GER(4), GER(5)
c+3: GER(6), GER(7)
c+4: GER(0), GER(3) . . . .

During the clock cycle c, the instructions GER(0) and GER(3) are issued to and respectively next executed by the MAC units 413B and 413A. In the following cycle c+1, the instructions GER(2) and GER(1) are issued to and respectively next executed by the MAC units 413B and 413A. In the following cycle c+2, the instructions GER(4) and GER (5) are issued to and respectively next executed by the MAC units 413B and 413A. In the following cycle c+3, the instructions GER(6) and GER(7) are issued to respectively next executed by the MAC units 413B and 413A. The processor unit 400 may enable a throughput comparable or better than existing systems. In cycle c+4 the GER(0) and GER(3) instructions execution have finished hence a new GER(0) and GER(3) instruction may be issued in the c+4 cycle to proceed the outer product calculation for the accumulators ACC(0) and ACC(3). GER(0) in cycle c may perform a first step of the MAC operation and GER(0) in cycle c+4 may perform a second step of that same MAC operation.

In another example, the stream of instructions may comprise only even indexed instructions GER(0), GER(2), GER (4) and GER(6). That is, only one issue queue comprises instructions to be executed. In this case, only one MAC unit may be used to perform the stream of instructions as follows:

Cycle cc: GER(0), none
cc+1: GER(2), none
cc+2: GER(4), none
cc+3: GER(6), none

During the clock cycle cc, the instruction GER(0) is issued to and next executed by the MAC unit 413B, while the MAC unit 413A is not executing any instruction. In the following cycle cc+1, the instruction GER(2) is issued to and next executed by the MAC units 413B while the MAC unit 413A is not executing any instruction. In the following cycle cc+2, the instruction GER(6) is issued to and next executed by the MAC unit 413B while the MAC unit 413A is not executing any instruction. In the following cycle cc+3, the instruction GER(6) is issued to and next executed by the MAC units 413B while the MAC unit 413A is not executing any instruction. The overall throughput may not be impacted by not using the 410A execution unit as with 4 ACCs in use the overall throughput may not be higher as 4 instructions given the 4 cycle latency that an instruction takes to finish the ACC result calculation.

Figure 5A:
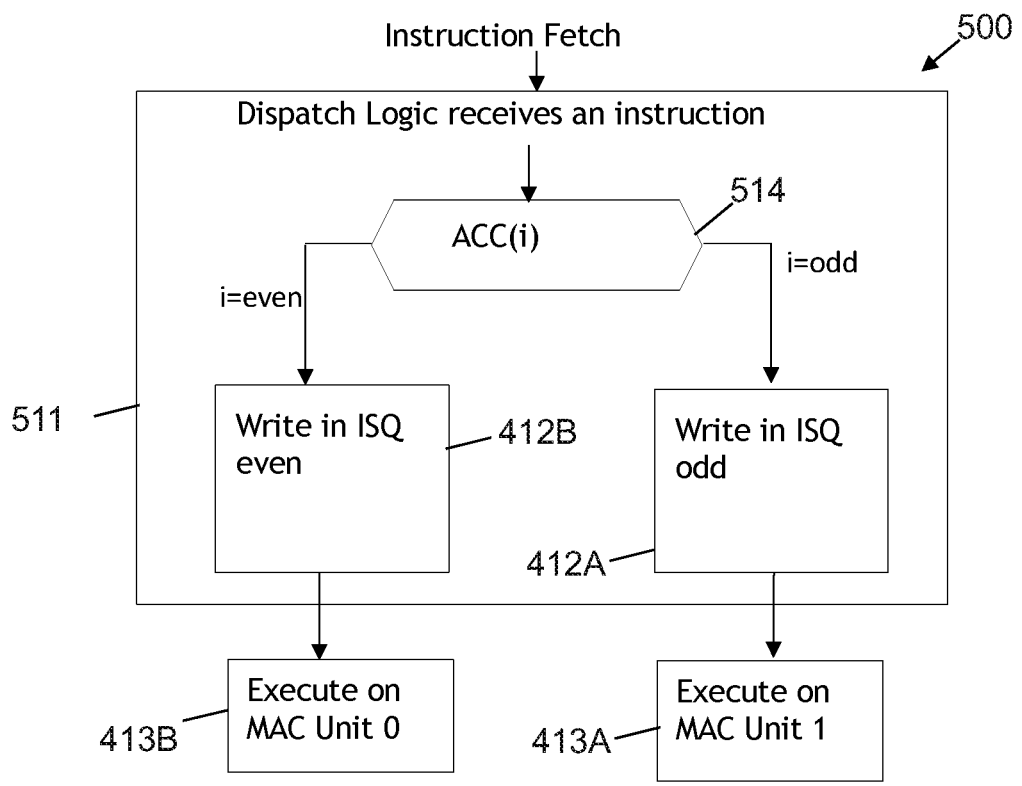
FIG. 5A is a block diagram illustrating an exemplary processor unit according to at least one embodiment.
Figure 5B:
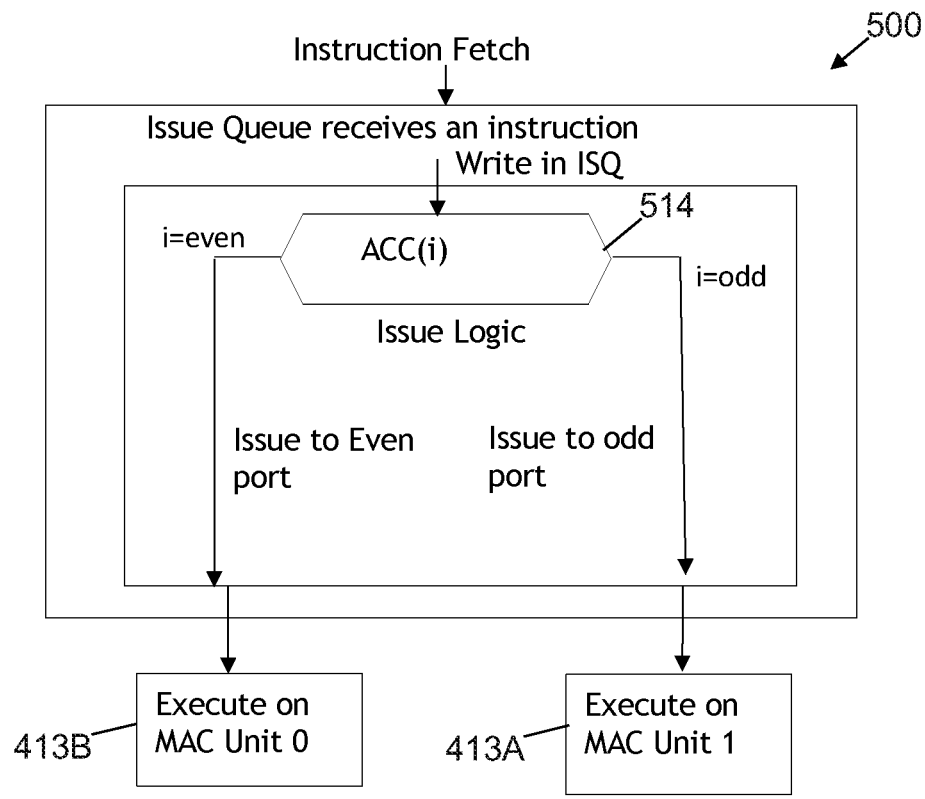
FIG. 5B is a block diagram illustrating an exemplary processor unit according to at least one embodiment.

Referring now to FIG. 5A, a block diagram illustrating a dispatch logic of a processor unit 500 according to at least one embodiment is depicted. Referring also to FIG. 5B, a block diagram illustrating an issue logic of the processor unit 500 according to at least one embodiment is depicted. The processor unit 500 may include a dispatch/issue unit 511 and MAC units 413A and 413B as described with reference to FIG. 4.

As indicated in FIG. 5A, the dispatch/issue unit 511 may be configured to receive a fetched and decoded instruction. The received instruction may reference an accumulator ACC(i) with a given index i. The dispatch and/or issue unit 511 comprises a logic circuitry 514. The logic circuitry 514 may be configured to determine, based on the index i, which of issue queues ("ISQs") 412A and 412B of the dispatch/ issue unit 511 would receive the instruction. Alternatively, as shown in FIG. 5B, the processor unit 500 may include a common issue queue port of the logic circuitry 514 and the combined issue queues 412A-B issue logic may be configured to issue respective instructions into an even or odd port of the MAC units 413A-B based on the index i of the accumulator ACC(i) in use.

Figure 6A:
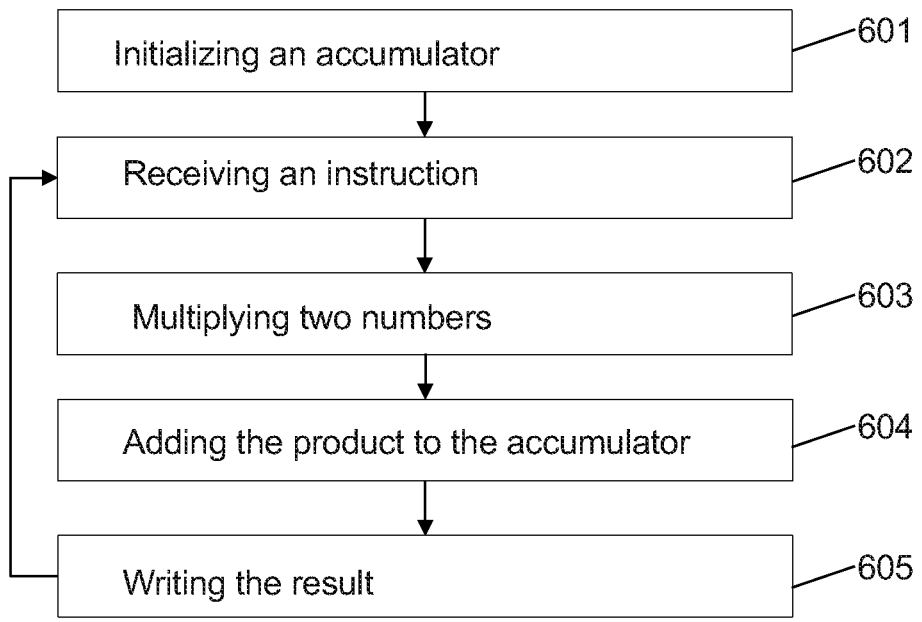
FIG. 6A is an operational flowchart illustrating an exemplary process for performing a set of one or more MAC operations according to at least one embodiment.
Figure 6B:
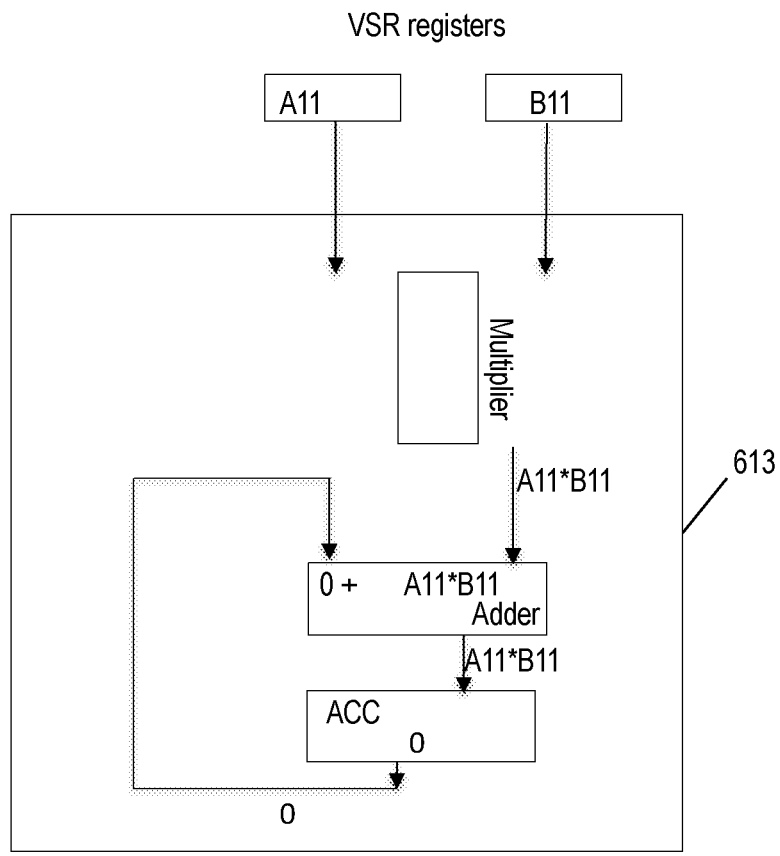
FIG. 6B is a block diagram illustrating an exemplary MAC unit associated with the MAC operations of FIG. 6A according to at least one embodiment.
Figure 6C:
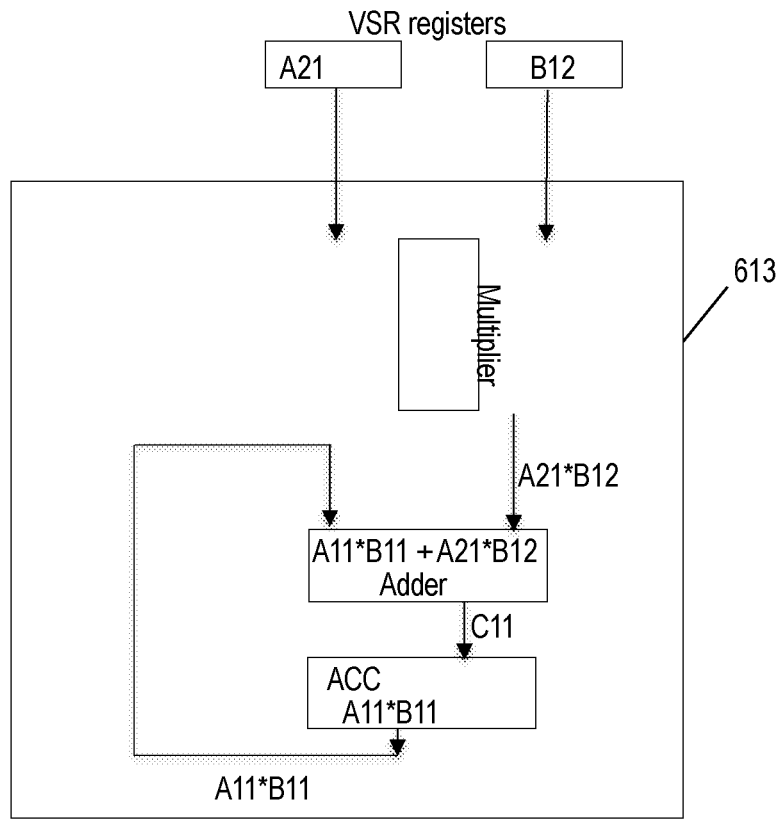
FIG. 6C is a block diagram illustrating the exemplary MAC unit associated with the MAC operations of FIG. 6A according to at least one embodiment.

Referring now to FIG. 6A, an operational flowchart illustrating an exemplary process for performing a set of one or more MAC operations according to at least one embodiment is depicted. Referring additionally to FIGS. 6B-6C, a block diagram illustrating the MAC unit associated with the MAC operations of FIG. 6A according to at least one embodiment is depicted.

For simplicity of the following description, the set of MAC operations in FIGS. 6A-6C may comprise (but is not limited to) the MAC operations for determining a matrix element equal to A11*B11+A21*B12.

For enabling the execution of the set of MAC operations, a stream of two instructions may be generated, where each of the instructions may enable performing a MAC operation of the set of MAC operations.

At 601, an accumulator is initialized. According to one embodiment, an accumulator of a MAC unit 613 may be initialized to zero. The accumulator may be part of a 1W/1R register file.

Then at 602, an instruction is received. According to one embodiment, a first instruction of the stream may be received at 602. The first instruction may reference two VSR registers as source registers. The first instruction further may reference the accumulator as a source and target register of the first instruction. The first instruction may for example be defined as follows using the GER instruction: GER ACC(i) ←ACC(i), VSR(j), VSR(k). As indicated in FIG. 6B, the VSR registers VSR(j) and VSR(k) comprise the values to be multiplied A11 and B11 and the accumulator stores the initial value. The values A11 and B11 may, for example, be stored in the VSR registers of the register file 119 by the load/store unit 117 for enabling the execution of the first instruction.

Then at 603, the values are multiplied. According to one embodiment, the values A11 and B11 may be received at a multiplier of the MAC unit 613. The multiplier may multiply the values A11 and B11 at 603 and provide the result of the multiplication A11*B11 to an adder of the MAC unit 613.

Then at 604, the result of the multiplication is added to an accumulator. According to one embodiment, the adder may read a current content of the accumulator ACC which may be zero as indicated in FIG. 6B. At 604, the adder may add the content of the accumulator ACC to the result of the multiplication A11 and B11.

Then at 605, the result is written. According to one embodiment, the result of the addition (e.g., A11*B11) may be written to the accumulator at 605. This may result in the first instruction being executed and completed.

A next instruction of the stream may be processed by repeating 602 to 605, as described above, for the second instruction of the stream. FIG. 6C illustrates the status of the MAC unit 613 for the execution of the second instruction. The VSR registers VSR(j) and VSR(k) may include the values to be multiplied A21 and B12 and the accumulator may store the value A11*B11. The second instruction may for example have a same syntax as the first instruction. 602-605 may be repeated until all instructions of the stream are processed.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A processor unit for multiply and accumulate ("MAC") operations, the processor unit comprising:
a first MAC unit and a second MAC unit for performing a respective subset of MAC operations of a set of MAC operations, each MAC unit of the first and second MAC units including a respective execution unit and a respective one-write one-read ("1W/1R") ported register file independently connected to the respective execution unit, the respective 1W/1R ported register file having at least one respective accumulator, wherein the at least one respective accumulator of the first MAC unit includes an even architected accumulator register index including only even index numbers and the at least one respective accumulator of the second MAC unit includes an odd architected accumulator register index including only odd index numbers, wherein each MAC unit is configured to perform the respective subset of MAC operations of the set of MAC operations by executing a processor instruction that references a corresponding index number associated with the MAC unit and the at least one respective accumulator; and
another register file, wherein the respective execution unit of each MAC unit is configured to perform the respective subset of MAC operations of the set of MAC operations by computing a product of a set of values received from the another register file and adding the computed product to a content of the at least one respective accumulator of the MAC unit, wherein each MAC unit is configured to perform the respective subset of MAC operations in a single clock cycle.

2. The processor unit of claim 1, the wherein the at least one respective accumulator includes a respective accumulator element, wherein the computed product is added to a content of the respective accumulator element, wherein each MAC unit is configured to perform the respective subset of MAC operations of a set of MAC operations using the respective accumulator element of the at least one respective accumulator.

3. The processor unit of claim 1, further comprising a dispatch/issue unit, the dispatch/issue unit being configured to process a plurality of processor instructions, select a MAC unit of the first and second MAC units using the corresponding index number, and send a respective set of processor instructions to the selected MAC unit for performing the set of MAC operations.

4. The processor unit of claim 3, wherein the respective set of processor instructions further comprises at least one operand indicating the at least one respective accumulator as a source and target register of the respective set of processor instructions and indicating at least one further register, of the another register file, comprising a set of numbers.

5. The processor unit of claim 3, wherein the dispatch/issue unit is associated with the selected MAC unit.

6. The processor unit of claim 3, wherein the dispatch/issue unit is configured to dispatch the plurality of processor instructions in accordance with a single threaded ("ST") mode such that the selected MAC unit receives the respective set of processor instructions from a single thread.

7. The processor unit of claim 3, wherein the dispatch/issue unit is configured to dispatch the plurality of processor instructions in accordance with a two-way simultaneous multithreading ("SMT2") mode such that the selected MAC unit receives the respective set of processor instructions from any one of two threads.

8. The processor unit of claim 3, wherein the dispatch/issue unit is configured to dispatch the plurality of processor instructions in accordance with a four-way simultaneous multithreading ("SMT4") mode such that each MAC unit of the first and second MAC units receives the respective set of processor instructions from respective two threads.

9. The processor unit of claim 1, wherein each MAC unit further comprises at least one multiplier for computing the product and at least one adder for performing the addition of the computed product.

10. The processor unit of claim 1, being configured to perform further sets of MAC operations, wherein all the sets of MAC operations provide all elements of an output matrix, the output matrix being a result of a matrix convolution on an input matrix.

11. A method for performing multiply and accumulate ("MAC") operations comprising:
selecting a MAC unit from a first MAC unit and a second MAC unit for executing a processor instruction based on a corresponding index number associated with the MAC unit that is referenced in the processor instruction, wherein each MAC unit of the first and second MAC units includes a respective execution unit and a respective one-write one-read ("1W/1R") ported register file independently connected to the respective execution unit, the respective 1W/1R ported register file having at least one respective accumulator, wherein the at least one respective accumulator of the first MAC unit includes an even architected accumulator register index including only even index numbers and the at least one respective accumulator of the second MAC unit includes an odd architected accumulator register index including only odd index numbers;
receiving the processor instruction at the respective execution unit of the selected MAC unit, wherein the processor instruction includes a set of values from a vector scalar register file, and wherein the respective execution unit includes a multiplier and an adder;
calculating, using the multiplier of the respective execution unit, a product of the set of values from the vector scalar register file;
reading a current content of the at least one respective accumulator of the selected MAC unit;
calculating, using the adder of the respective execution unit, a sum of the read current content of the at least one respective accumulator and the calculated product of the set of values from the vector scalar register file; and
writing the calculated sum to the at least one respective accumulator of the selected MAC unit.

12. A computer program product for performing multiply and accumulate ("MAC") operations, the computer program product comprising:
one or more computer-readable storage media and program instructions collectively stored on the one or more computer-readable storage media, the program instructions comprising:
program instructions to select a MAC unit from a first MAC unit and a second MAC unit for executing a processor instruction based on a corresponding index number associated with the MAC unit that is referenced in the processor instruction, wherein each MAC unit of the first and second MAC units includes a respective execution unit and a respective one-write one-read ("1W/1R") ported register file independently connected to the respective execution unit, the respective 1W/1R ported register file having at least one respective accumulator, wherein the at least one respective accumulator of the first MAC unit includes an even architected accumulator register index including only even index numbers and the at least one respective accumulator of the second MAC unit includes an odd architected accumulator register index including only odd index numbers;
program instructions to receive the processor instruction at the respective execution unit of the selected MAC unit, wherein the processor instruction includes a set of values from a vector scalar register file, and wherein the respective execution unit includes a multiplier and an adder;
program instructions to calculate, using the multiplier of the respective execution unit, a product of the set of values from the vector scalar register file;
program instructions to read a current content of the at least one respective accumulator of the selected MAC unit;
program instructions to calculate, using the adder of the respective execution unit, a sum of the read current content of the at least one respective accumulator and the calculated product of the set of values from the vector scalar register file; and
program instructions to write the calculated sum to the at least one respective accumulator of the selected MAC unit.

13. A processor unit for multiply and accumulate ("MAC") operations, the processor unit comprising:
a first MAC unit and a second MAC unit;
a respective execution unit for each MAC unit of the first and second MAC units; and
a respective one-write one-read ("1W/1R") ported register file independently connected to the respective execution unit, the respective 1W/1R ported register file including at least one respective accumulator, wherein the at least one respective accumulator of the first MAC unit includes an even architected accumulator register index including only even index numbers and the at least one respective accumulator of the second MAC unit includes an odd architected accumulator register index including only odd index numbers, wherein each MAC unit is configured to perform a MAC operation by executing a processor instruction that references the corresponding index number associated with the MAC unit and the at least one respective accumulator, and wherein the respective execution unit of each MAC unit is configured to perform the MAC operation by computing a product and adding the product to a content of the at least one respective accumulator of the MAC unit.

14. The processor unit of claim 13, wherein the respective execution unit of each MAC unit is configured to consecutively perform a plurality of MAC operations using a same accumulator for accumulating the product of each MAC operation of the plurality of MAC operations.

15. The processor unit of claim 13, wherein the at least one respective accumulator further comprises: a plurality of accumulators, wherein each MAC unit is configured to perform a plurality of MAC operations in parallel using a respective accumulator of the plurality of accumulators.

16. The processor unit of claim 13, further comprising:
at least one multiplier for performing the computation of the product; and
at least one adder for performing an addition of the product.

17. The processor unit of claim 13, wherein the at least one respective accumulator further comprises a plurality of accumulator elements, each MAC unit comprising a plurality of multipliers and an adder, wherein each MAC unit is configured to perform a plurality of MAC operations in parallel using respective accumulator elements of the plurality of accumulator elements and respective multipliers of the plurality of multipliers.

* * * * *